(12) United States Patent
Litzba

(10) Patent No.: US 12,509,239 B2
(45) Date of Patent: Dec. 30, 2025

(54) AVIATION PROPULSION SYSTEM FOR AN AIRCRAFT WITH ROTATABLE SHAFTS HAVING MUTUALLY FACING ENDS CONNECTED VIA SHAFT COUPLING, GEARBOX UNIT AND OVERLOAD PROTECTION ELEMENT

(71) Applicant: AIRBUS HELICOPTERS TECHNIK GMBH, Calden (DE)

(72) Inventor: Joerg Litzba, Fuldatal (DE)

(73) Assignee: AIRBUS HELICOPTERS TECHNIK GMBH, Calden (DE)

( * ) Notice: Subject to any disclaimer, the term of this patent is extended or adjusted under 35 U.S.C. 154(b) by 0 days.

(21) Appl. No.: 18/281,877

(22) PCT Filed: Mar. 10, 2022

(86) PCT No.: PCT/EP2022/056193
§ 371 (c)(1),
(2) Date: Sep. 13, 2023

(87) PCT Pub. No.: WO2022/194669
PCT Pub. Date: Sep. 22, 2022

(65) Prior Publication Data
US 2024/0150031 A1 May 9, 2024

(30) Foreign Application Priority Data
Mar. 15, 2021 (DE) .......................... 102021202487.4

(51) Int. Cl.
*B64D 35/04* (2006.01)
*B64D 35/08* (2006.01)

(52) U.S. Cl.
CPC ............. *B64D 35/04* (2013.01); *B64D 35/08* (2013.01)

(58) Field of Classification Search
CPC ............................... B64D 35/04; B64D 35/08
See application file for complete search history.

(56) References Cited

U.S. PATENT DOCUMENTS 2,893,525 A 7/1959 Mcdowall et al.
3,220,283 A 11/1965 Ricard
(Continued)

FOREIGN PATENT DOCUMENTS

DE 102008048915 A1 4/2010
EP 0448672 B1 4/1994
(Continued)

OTHER PUBLICATIONS

International Search Report for International Application No. PCT/EP2022/056193, Completed by the International Patent Office, Dated May 18, 2023, 4 pages.
(Continued)

*Primary Examiner* — Arfan Y. Sinaki
(74) *Attorney, Agent, or Firm* — Brooks Kushman P.C.

(57) ABSTRACT

An aviation propulsion system for an aircraft with two engines, comprising respectively a connecting shaft which is rotatably drivable in rotation by one of the engines, wherein mutually facing ends of both connecting shafts are connected to each other or are connectable to each other in a rotatably drivable manner. Both connecting shafts are connected via their mutually facing ends in a rotatably drivable manner to one of the mutually facing ends of the connecting shafts via a openable coupling.

19 Claims, 2 Drawing Sheets

(56) References Cited

U.S. PATENT DOCUMENTS

| | | | |
|---|---|---|---|
| 3,485,462 | A | 12/1969 | Spence |
| 6,260,351 | B1 | 7/2001 | Delano et al. |
| 2006/0011780 | A1* | 1/2006 | Brand .................... B64D 27/14 244/55 |
| 2009/0224096 | A1 | 9/2009 | Waide et al. |
| 2010/0276549 | A1 | 11/2010 | Karem |
| 2011/0220759 | A1 | 9/2011 | Stolte |
| 2015/0274306 | A1* | 10/2015 | Sheridan .............. B64D 35/023 60/726 |
| 2017/0297679 | A1 | 10/2017 | Elliott et al. |
| 2018/0327104 | A1 | 11/2018 | Abele et al. |
| 2019/0183056 | A1* | 6/2019 | Vergara ................ A01D 34/828 |
| 2019/0264752 | A1 | 8/2019 | King |
| 2019/0344877 | A1 | 11/2019 | Gilliland et al. |

FOREIGN PATENT DOCUMENTS

| | | |
|---|---|---|
| EP | 3395680 A1 | 10/2018 |
| JP | 2000177697 A | 6/2000 |
| WO | 2022194669 A1 | 9/2022 |

OTHER PUBLICATIONS

German Office Action for Application No. DE102021202487, dated Jan. 3, 2022, 11 pages.
International Preliminary Report on Patentability for International Application No. PCT/EP2022/056193, dated Sep. 12, 2023, 16 pages.
Second Japanese Office Action for Application No. JP2024509569, dated Jan. 30, 2025, 13 pages.
Korean Office Action for Application No. KR1020230152049, dated Apr. 20, 2025, 11 pages.

* cited by examiner

AVIATION PROPULSION SYSTEM FOR AN AIRCRAFT WITH ROTATABLE SHAFTS HAVING MUTUALLY FACING ENDS CONNECTED VIA SHAFT COUPLING, GEARBOX UNIT AND OVERLOAD PROTECTION ELEMENT

CROSS-REFERENCE TO RELATED APPLICATIONS

This application is the U.S. national phase of PCT Application No. PCT/EP2022/056193 filed on Mar. 10, 2022, which claims priority to German Patent Application No. DE 102021202487.4 filed on Mar. 15, 2021, the disclosures of which are incorporated in their entireties by reference herein.

TECHNICAL FIELD

The disclosure relates to an aviation propulsion system of an aircraft with two engines, comprising respectively a connecting shaft which is rotatably drivable by one of the engines, wherein mutually facing ends of both connecting shafts are connected to each other or are connectable to each other in a rotatably drivable manner.

BACKGROUND

An aviation propulsion system of this type is known from EP 0 448 672 B1. In this regard, an auxiliary supply device of the aircraft is drivable by means of a gearbox assembly between the connecting shafts. The aircraft may, for example, be an aeroplane with two engines which are connected to each other by the connecting shafts. However, the disclosure may also advantageously be used in rotary wing aircraft with two engines which are connected to each other by the connecting shafts.

SUMMARY

An objective of the disclosure is to provide an aviation propulsion system of the type described above which makes a plurality of operating modes possible and leads to greater operational safety with a low component requirement.

In accordance with the disclosure, this objective is achieved by both connecting shafts being connected via their mutually facing ends in a rotatably drivable manner to one of the mutually facing ends of the connecting shafts via an openable coupling.

The aircraft may, for example, be an aeroplane or a rotary wing aircraft.

As a result of this configuration, one engine can be switched off by opening the coupling. This comprises the advantage that this engine can be switched off in the event of a malfunction of an engine. The function of the other engine is not affected thereby and the further operation of the flight is not jeopardized.

One of the engines can also be switched off during the flight operation in order to save fuel, such as jet fuel, for example, by using only one engine.

A further possible type of operation consists in the fact that, during ground operations, for example after a landing, both engines do not have to be switched off. It is enough to switch off one of the engines and to open the coupling so that it is possible to move more flexibly and more rapidly and still save fuel during ground operations. Preferably in this regard, the engine located on the side of the cargo door is switched off.

Since only a single coupling is present, the number of components is kept low. This saves on both the installation space required and on weight. Furthermore, this leads to a reduction in the cost of the aviation propulsion system in comparison to the potential use of multiple couplings, as well as to an improvement in the reliability of the aviation propulsion system.

In order to be able to supply further devices with a rotary drive the engines, so that a separate drive is not required in order to save installation space and weight, one end of one of the connecting shafts may be connected in a rotatably drivable manner to the openable coupling via a gearbox unit, and the openable coupling may be connected in a rotatably drivable manner to one end of the second of the connecting shafts.

If an overload protection element which opens when a predetermined torque acting on the one of the connecting shafts is exceeded is arranged between the end of one of the connecting shafts and the gearbox unit or the coupling, then in the event of a fault in the engine connected to this connecting shaft and overloading of this connecting shaft, a separation of the faulty engine takes place immediately by opening the overload protection element, so that the other engine can continue to operate uninfluenced by this fault.

A compact design requiring only a small amount of installation space results when the coupling and/or the gearbox unit and/or the overload protection element form a structural unit.

The coupling and the gearbox unit and, if applicable, the overload protection element may be arranged in the center of a wing of the aircraft, wherein they may, for example, be arranged in a fuselage of the aircraft. Alternatively and preferably, the coupling and the gearbox unit may also be arranged in a wing structure in the area of the fuselage. In both cases, they are well protected from environmental influences and easily accessible for maintenance and repairs.

The two connecting shafts may be arranged coaxially with respect to each other.

However, it is also possible for the two connecting shafts to extend in a manner that deviates from coaxiality with respect to each other.

In this regard, so that the two connecting shafts can be connected to each other in a rotatably drivable manner and in a simple manner, the gearbox unit may be a bevel gear unit.

In a simple embodiment, the overload protection element may be a shear bolt.

A further device that can be driven by one of the engines may be an auxiliary supply device of the aircraft which can be drivable by means of the gearbox unit.

Examples of auxiliary supply devices are a hydraulic pump, a compressor or a generator.

BRIEF DESCRIPTION OF THE DRAWING

An exemplary embodiment of the disclosure is shown in the drawing and will be described in more detail below.

DETAILED DESCRIPTION

Figure 1:
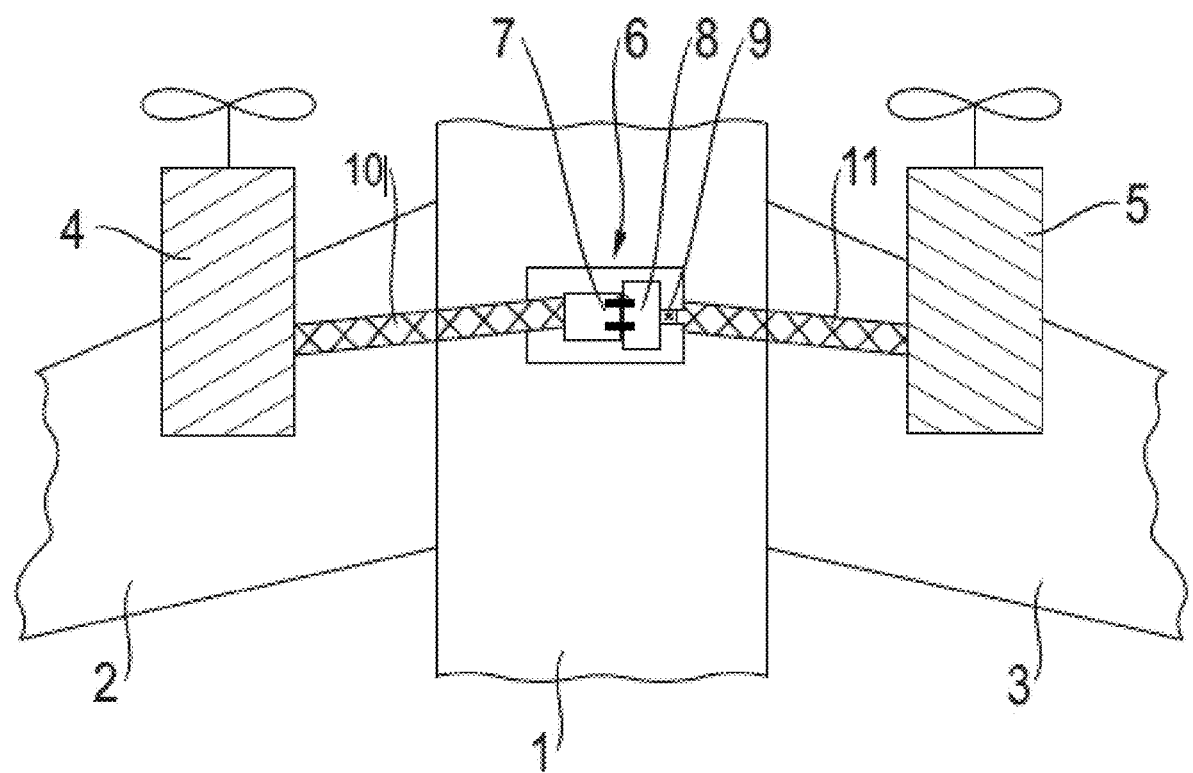
FIG. 1 shows a diagrammatic representation of a section of a plan view of an aircraft with the shaft coupling shown closed in an engaged configuration.
Figure 2:
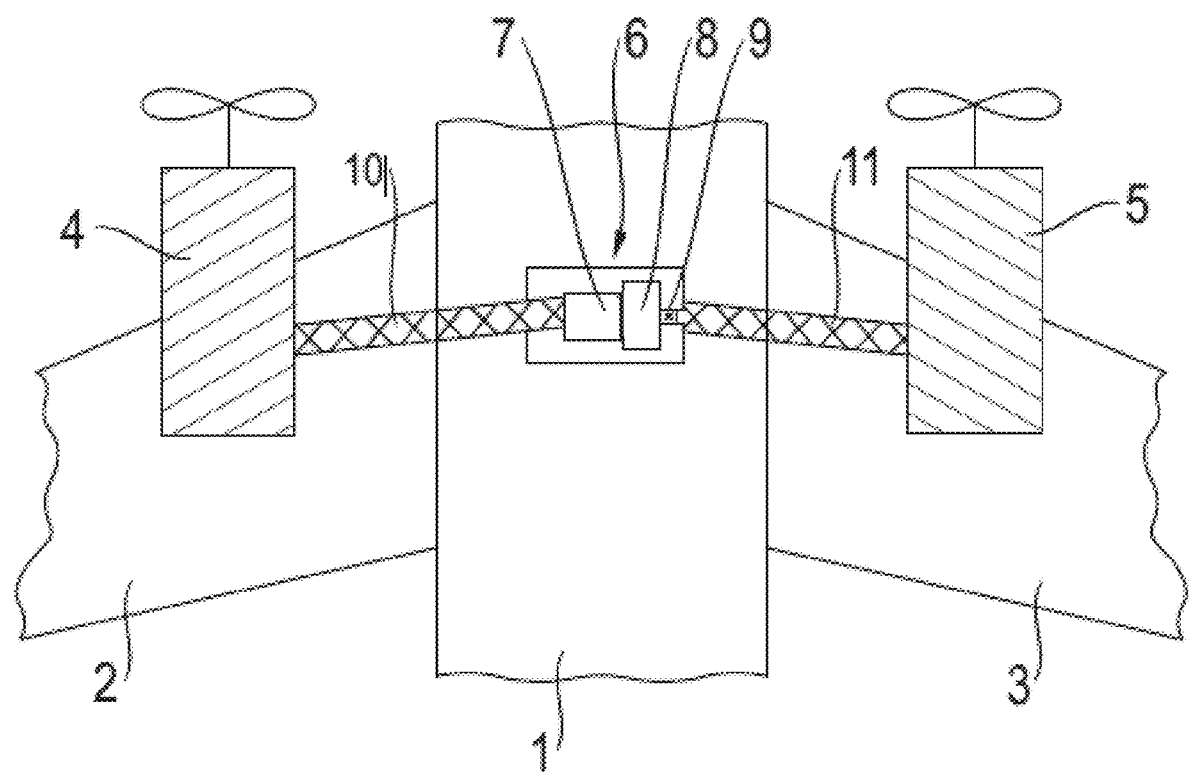
FIG. 2 shows a diagrammatic representation of a section of a plan view of an aircraft with the shaft coupling shown open in a disengaged configuration.

A first wing 2 and a second wing 3 extend opposite to each other from a fuselage 1 of the aircraft.

The first wing 2 carries a first engine 4 and the second wing 3 carries a second engine 5.

A structural unit 6 which consists of a gearbox unit 7, a openable coupling 8 and an overload protection element 9 is arranged in a housing between the two wings 2 and 3 in the fuselage 1.

A first connecting shaft 10 from the first engine 4 leads to the gearbox unit 7, which is therefore rotatably drivable by the first engine 4, the output opposite to the first connecting shaft 10 of which being connected to the coupling 8.

A second connecting shaft 11 leads from the second engine 5 via the overload protection element 9 to the coupling 8.

Thus, the first connecting shaft 10 and the second connecting shaft 11 are non-rotatably connected to each other via the gearbox unit 7, the coupling 8 of which is engaged during normal operation, and the overload protection element 9.

This connection which is fixed against rotation can on the one hand be disengaged by disengaging the coupling 8.

On the other hand, however, this connection which is fixed against rotation can also be broken by the overload protection element 9 when the torque acting on it exceeds a predetermined torque.

The two connecting shafts 10 and 11 extend at an angle with respect to each other, i.e. they are not coaxial with respect to each other. For this reason, the gear unit 7 is a bevel gear unit.

REFERENCE NUMERALS 1 fuselage
2 first wing
3 second wing
4 first engine
5 second engine
6 structural unit
7 gearbox unit
8 coupling
9 overload protection element
10 first connecting shaft
11 second connecting shaft

The invention claimed is:

1. An aviation propulsion system of an aircraft with two engines comprising: two connecting shafts, each connecting shaft being rotatably drivable by one of the engines, wherein mutually facing ends of the two connecting shafts are connected to each other or are connectable to each other in a rotatably drivable manner,
wherein the two connecting shafts are connected via mutually facing ends of the two connecting shafts in a rotatably drivable manner to one of the mutually facing ends of the two connecting shafts via a gearbox unit, a shaft coupling, and
an overload protection element, and wherein the shaft coupling, the gearbox unit, and the overload protection element form a structural unit.

2. The aviation propulsion system of claim 1, wherein one end of one of the two connecting shafts is connected in a rotatably drivable manner to the shaft coupling via the gearbox unit, and wherein the shaft coupling is connected in a rotatably drivable manner to one end of a second of the two connecting shafts.

3. The aviation propulsion system of claim 2, wherein the two connecting shafts extend in a manner that deviates from coaxiality with respect to each other.

4. The aviation propulsion system of claim 3, wherein the gearbox unit is a bevel gear unit.

5. The aviation propulsion system of claim 1, wherein the overload protection element is arranged between an end of one of the two connecting shafts and the gearbox unit or the shaft coupling, wherein the overload protection element opens when a predetermined torque acting on the one of the two connecting shafts is exceeded.

6. The aviation propulsion system of claim 5, wherein the overload protection element is a shear bolt.

7. The aviation propulsion system of claim 1, wherein the shaft coupling, the gearbox unit, and the overload protection element are arranged in the center of a wing in a fuselage of the aircraft or in a wing structure in an area of the fuselage.

8. The aviation propulsion system of claim 1, wherein the shaft coupling is positioned between the two connecting shafts, wherein the shaft coupling is operable between an engaged configuration where the two connecting shafts are non-rotatably connected via the gearbox unit, and the shaft coupling is configured to be opened to a disengaged configuration.

9. An aviation propulsion system of an aircraft with two engines, the propulsion system comprising:
a first engine of the two engines;
a first connecting shaft being rotatably driven by the first engine at a driven end and having a facing end opposite the driven end;
a second engine of the two engines;
a second connecting shaft being rotatably driven by the second engine at a driven end and having a facing end opposite the driven end, wherein the facing end of each of the first and second connecting shafts mutually face each other;
a structural connection unit positioned between the facing end of each of the first and second connecting shafts, the structural connection unit comprising:
a gearbox connected to the facing end of the first connecting shaft;
a shaft coupling connecting the facing end of each of the first and second connecting shafts, wherein the shaft coupling is operable between an engaged configuration and a disengaged configuration,
wherein in the engaged configuration, the first and second connecting shafts are non-rotatably connected to each other via the gearbox,
wherein in the disengaged configuration the first and second connecting shafts are rotatably connected to each other; and
a shear bolt positioned between one of the first and second connecting shafts and the gearbox, wherein shear bold breaks when a predetermined torque acts on the one of the first and second connecting shafts.

10. The aviation propulsion system of claim 9, wherein the first and second connecting shafts are not arranged coaxially.

11. The aviation propulsion system of claim 9, wherein the gearbox comprises a bevel gear.

12. The aviation propulsion system of claim 9, wherein the structural connection unit is arranged in a wing structure in an area of the fuselage.

13. The aviation propulsion system of claim 12, wherein the first connecting shaft extends from a first wing on which the first engine is positioned, and the second connecting shaft extends from a second wing on which the second engine is positioned.

14. An aviation propulsion system of an aircraft with two engines, the propulsion system comprising:
- two connecting shafts comprising a first connecting shaft and a second connecting shaft, each of the two connecting shafts being rotatably drivable by one of the two engines, wherein an end of each the two connecting shafts mutually face each other;
- a structural connection unit connecting the end of each of the two connecting shafts, the structural connection unit comprising:
  - a gearbox connected to the end of the first connecting shaft;
  - a shaft coupling connecting the end of each of the two connecting shafts, wherein the shaft coupling is operable between an engaged configuration and a disengaged configuration,
  - wherein in the engaged configuration, the two connecting shafts are non-rotatably connected to each other via the gearbox,
  - wherein in the disengaged configuration the two connecting shafts are rotatably connected to each other.

15. The aviation propulsion system of claim 14, wherein when the shaft coupling is engaged the two connecting shafts are non-rotatably connected to each other via the gearbox.

16. The aviation propulsion system of claim 14, wherein the shaft coupling is disengaged when one of the two engines is switched off.

17. The aviation propulsion system of claim 14, wherein the structural connection unit further comprises an overload protection element positioned between one of the first and second connecting shafts and the gearbox, wherein the overload protection element opens when a predetermined torque acts on the one of the first and second connecting shafts.

18. The aviation propulsion system of claim 17, wherein the overload protection element is positioned between the second connecting shaft and the shaft coupling.

19. The aviation propulsion system of claim 17, wherein the overload protection element comprises a shear bolt.

* * * * *